(12) United States Patent
Demuynck

(10) Patent No.: US 8,108,014 B2
(45) Date of Patent: Jan. 31, 2012

(54) PORTABLE COMMUNICATION DEVICE INCLUDING A SPRING LIFT ASSEMBLY

(75) Inventor: Randolph C. Demuynck, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 862 days.

(21) Appl. No.: 12/048,754

(22) Filed: Mar. 14, 2008

(65) Prior Publication Data

US 2009/0233660 A1    Sep. 17, 2009

(51) Int. Cl.
*H04M 1/00* (2006.01)
*H04B 1/38* (2006.01)

(52) U.S. Cl. ............... 455/575.1; 455/90.3; 455/575.4

(58) Field of Classification Search ............ 455/90.3, 455/566, 575.1, 575.4; 379/433.12
See application file for complete search history.

(56) References Cited

U.S. PATENT DOCUMENTS

| 7,532,169 | B2 * | 5/2009 | Joo et al. | 343/702 |
| 7,548,769 | B2 * | 6/2009 | Lee et al. | 455/575.1 |
| 7,599,721 | B2 * | 10/2009 | Taki et al. | 455/575.1 |
| 7,747,298 | B2 * | 6/2010 | Kim et al. | 455/575.4 |
| 7,774,033 | B2 * | 8/2010 | Lee | 455/575.4 |
| 2005/0113154 | A1 * | 5/2005 | Park et al. | 455/575.4 |
| 2005/0233785 | A1 * | 10/2005 | Park et al. | 455/575.4 |
| 2006/0046796 | A1 * | 3/2006 | Park et al. | 455/575.4 |
| 2007/0004477 | A1 * | 1/2007 | Kim | 455/575.4 |
| 2008/0058039 | A1 * | 3/2008 | Lee et al. | 455/575.4 |
| 2008/0102908 | A1 * | 5/2008 | Chen et al. | 455/575.4 |

FOREIGN PATENT DOCUMENTS

| EP | 1 638 298 | 3/2006 |
| EP | 1 667 408 | 6/2006 |
| EP | 1 760 996 | 3/2007 |
| WO | 2008/074358 | 6/2008 |

OTHER PUBLICATIONS

International Search Report and Written Opinion for International Application No. PCT/US2008/076185 dated Jan. 22, 2009.
International Preliminary Report on Patentability for International Application No. PCT/US08/076185 dated Jun. 28, 2010.

* cited by examiner

*Primary Examiner* — Simon Nguyen
(74) *Attorney, Agent, or Firm* — Renner, Otto, Boisselle & Sklar, LLP

(57) ABSTRACT

A portable communication device is configured to include a display and an auxiliary portion. In conventional operating modes, such as with the display closed or slid open to access the keypad, the auxiliary portion is concealed by the display. When the display is slid downward relative to the base, the auxiliary portion is revealed and a lift assembly raises the auxiliary portion relative to the base to a position that is generally coplanar with the display.

16 Claims, 4 Drawing Sheets

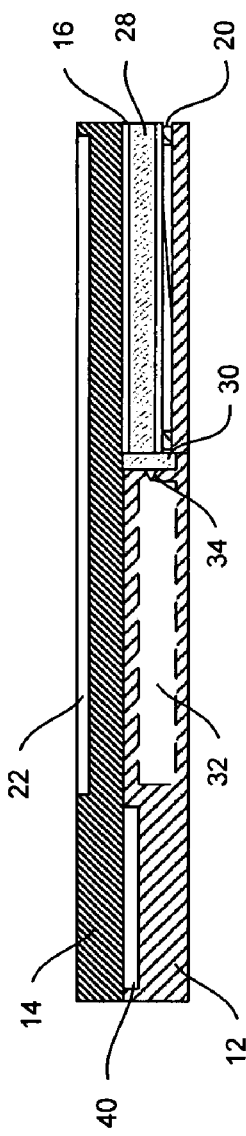
FIG. 1B
FIG. 1C
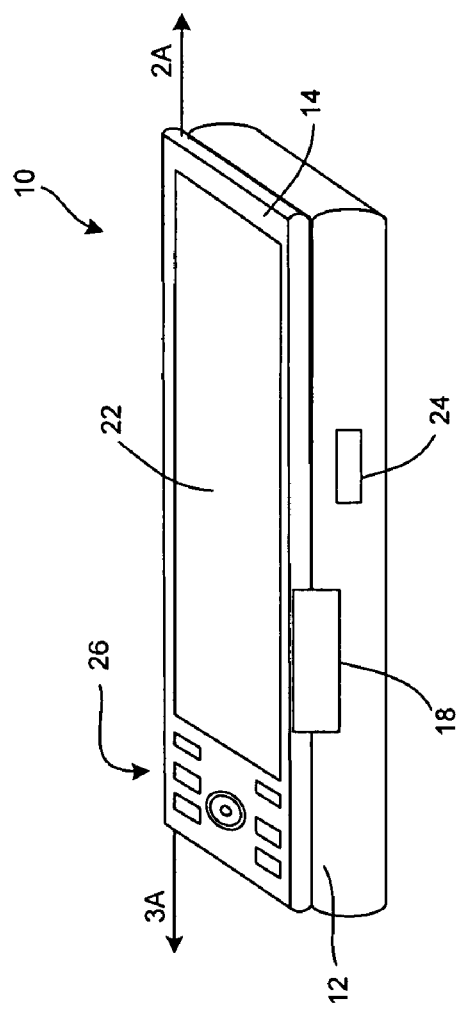
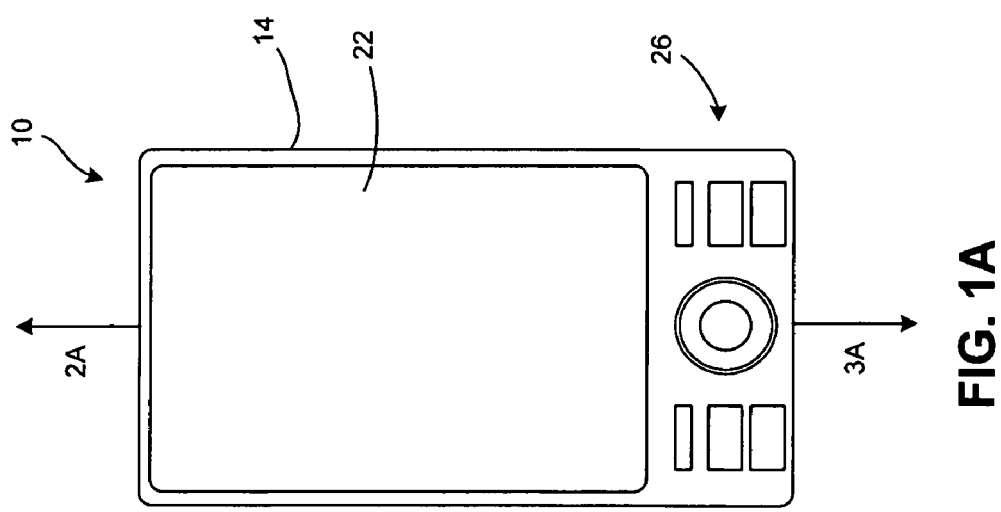
FIG. 1A

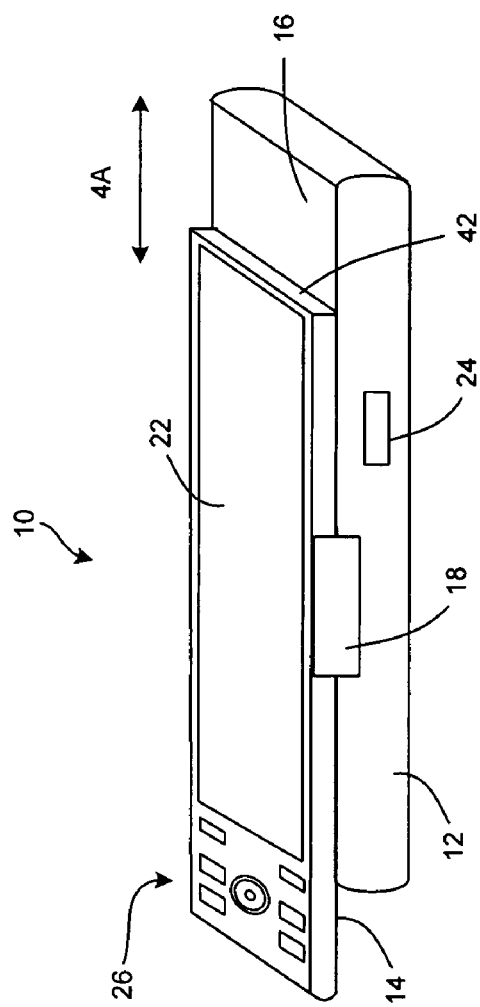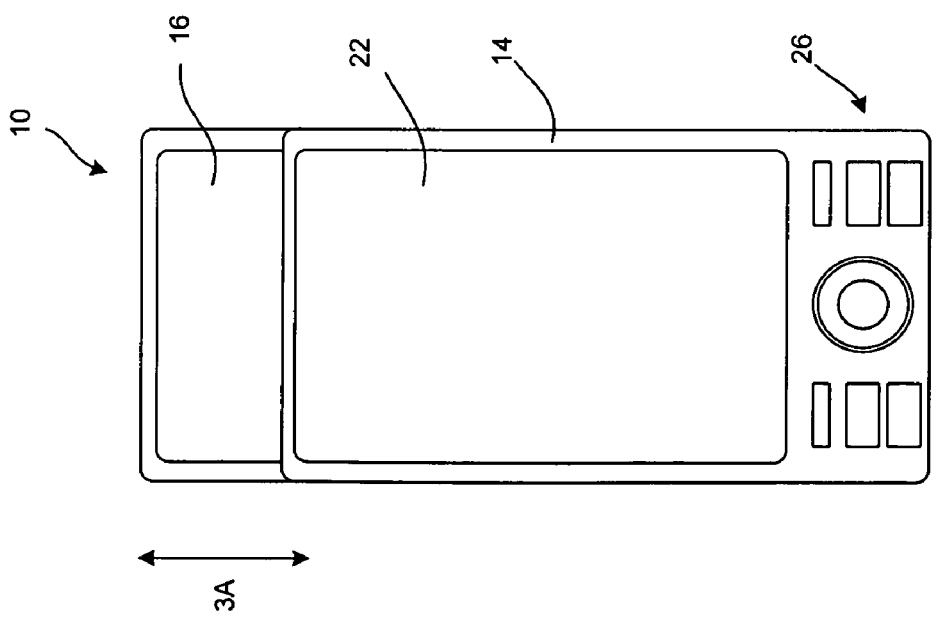

PORTABLE COMMUNICATION DEVICE INCLUDING A SPRING LIFT ASSEMBLY

TECHNICAL FIELD OF THE INVENTION

The present invention relates generally to portable communication devices, and more particularly, to a portable communication device having an auxiliary display and/or control area coupled to a spring lift assembly.

DESCRIPTION OF THE RELATED ART

Portable communication devices, and in particular mobile telephones, are used for a wide variety of applications. For example, mobile phones are used not only for phone conversations and for sending/receiving messages, but also for browsing the internet, viewing multimedia content, such as movies or music, and for playing games, etc.

In general, the display screen on a mobile phone is limited by the size of the phone. As mobile phones are reduced in size, the surface area available for the display screen, functional keys and a keypad is reduced. In order to maximize the size of the display screen, some mobile devices are designed with a base and a display that is movable relative to the base. In these mobile phones, the keypad often is incorporated into the base and exposed only after opening/moving the display. Known mobile devices of this variety include clamshell devices, in which the display is connected to the base via a conventional rotational hinge, and slider devices, in which the display is slidable with respect to the base, for example, on a rail or a track.

SUMMARY

To enhance functionality and versatility, a mobile phone is provided with an auxiliary portion coupled to a lift assembly that is operable to raise the auxiliary portion of the mobile phone relative to the base. The auxiliary portion may be configured to include additional controls areas and/or a supplemental display.

One aspect of the disclosed technology relates to a portable communication device that includes a base portion; a display portion coupled to the base portion by a hinge, wherein the hinge is configured to facilitate sliding motion between the base portion and the display portion; and an auxiliary portion coupled to the base portion by a lift assembly, the lift assembly configured to move the auxiliary portion from a retracted position to a raised position.

According to another aspect, the display portion is movable relative to the base to a first position in which the display portion conceals the auxiliary portion and a second position in which the auxiliary portion is not concealed by the display.

According to another aspect, the auxiliary portion is raised relative to the base when the display is in the second position.

According to another aspect, when the display portion is in the first position, a keypad disposed on the base is accessible.

According to another aspect, the lifting assembly is spring loaded.

According to another aspect, the lifting assembly comprises a scissor hinge.

According to another aspect, the lifting assembly comprises a compression spring.

According to another aspect, the auxiliary portion comprises an auxiliary display.

According to another aspect, the auxiliary portion comprises a control panel.

According to another aspect, the auxiliary portion comprises touch screen controls.

According to another aspect, the auxiliary portion comprises a touch-sensitive input device.

According to another aspect, wherein the portable communication device is a mobile phone.

Another aspect of the disclosed technology relates to a portable communication device that includes a base portion; and a top portion coupled to the base portion by a sliding hinge assembly, wherein the sliding hinge assembly is configured to facilitate sliding motion between the base portion and the top portion in a first direction and in a second direction opposite the first direction.

According to another aspect, the top portion includes a display.

According to another aspect, the portable communication device includes an auxiliary portion coupled to the base portion, wherein the auxiliary portion is configured to remain in a retracted position when the top portion is moved in the first direction to a first position and to move to a raised position when the top portion is moved in the second direction to a second position.

According to another aspect, the auxiliary portion includes a touch-sensitive input device.

According to another aspect, the touch-sensitive input device is a touch screen.

According to another aspect, the portable communication device is configured to operate in a portrait mode when the display portion is in the first position, and the portable communication device is configured to operate in a landscape mode when the display portion is in the second position with the auxiliary portion in the raised position.

According to another aspect, the top portion and the auxiliary portion cooperate to partially retract the auxiliary portion when the top portion is moved from the second position in the first direction.

According to another aspect, the portable communication device is a mobile phone.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 1A is a top view of an exemplary portable communication device, such as a mobile telephone, in a closed position.

FIG. 1B is a perspective view of the mobile telephone of FIG. 1A.

FIG. 1C is sectional view of the mobile phone of FIG. 1A.

FIG. 3A is a top view of the mobile telephone of FIG. 1A with the display partially slid to expose an auxiliary portion.

FIG. 3B is a perspective view of the mobile telephone of FIG. 3A.

DETAILED DESCRIPTION OF EMBODIMENTS

Figure 2C:
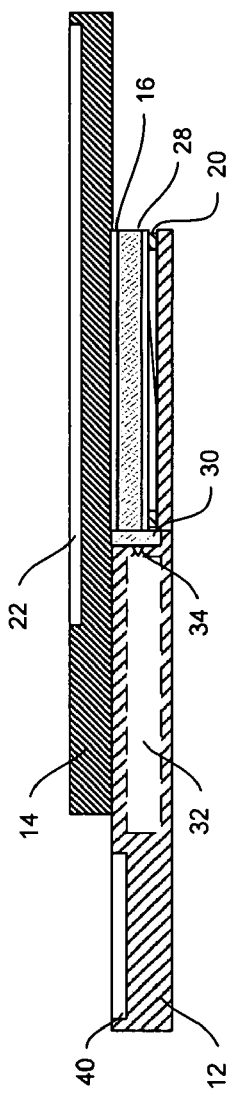
FIG. 2C is a sectional view of the mobile telephone of FIG. 2A.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form. Certain terminology is used herein to describe the different embodiments of the invention. Such terminology is used only for convenience when referring to the figures. For example, "upward" or "downward" merely describe directions in the configurations shown in the figures. The components can be oriented in any direction and the terminology should therefore be interpreted to include such variations.

As referred to herein, the term "portable communication device" includes portable radio communication equipment. The term "portable radio communication equipment," which herein after is referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like.

In the context of the illustrated embodiments, the portable communication device is primarily referred to as a mobile telephone or a mobile phone. The description and illustrations of the mobile telephone, however, are intended to serve as a non-limiting exemplary environment for the inventive concepts described herein, and it will be appreciated that the invention is not intended to be limited to a mobile telephone, but rather can be any type of electronic equipment.

Mobile phones with slider hinges typically include a keypad on the base that is exposed by sliding the display vertically and/or horizontally relatively to the base. Functional keys, typically located on the same surface as the display, are used for navigating menus and for initiating various functions on the device. Due to the location of the functional keys, the surface area available for the display screen is reduced, thus requiring the display screen to also be reduced in size. Furthermore, when the display is slid open, the functional keys are slid away from the user's hands, making them generally difficult to reach and/or inconvenient to use.

The present disclosure recognizes shortcomings with conventional portable communication devices, including slider mobile phones, and provides a portable communication device (e.g., a mobile phone) having a base, a display (e.g., a main display) and an auxiliary portion (e.g., an auxiliary display and/or an auxiliary control area). In conventional operating modes, such as with the main display closed or slid to a first position relative to the base (e.g., open to access the keypad) the auxiliary portion is disposed beneath or otherwise concealed by the display. When the display is slid to a second position relative to the base (e.g., a downward position in a direction opposite the direction of the first position) the auxiliary portion is revealed by way of a lift assembly that raises the auxiliary portion relative to the base to a position that is generally coplanar with the main display.

Referring initially to FIGS. 1A-1C, the mobile phone 10 is shown as it would appear when operating in what is conventionally referred to as a "standby" mode. The mobile phone 10 includes a base 12 (also referred to as a housing), a display portion 14 (also referred to as a display, main display or a top portion) and an auxiliary portion 16. The display 14 is coupled to a base 12 with a slider hinge 18. Unlike conventional slider hinge assemblies, slider hinge 18 is configured to facilitate sliding motion between the display and the base along a first direction (e.g., upward) to a first position as well as along a second direction (e.g., downward) to a second position. The auxiliary portion 16 is coupled to the base 12 with a lift assembly 20, which lifts the auxiliary portion 16 relative to the base 12 when the display 14 is slid into a predetermined position (e.g., downward to the second position). As shown in FIGS. 1A and 1B, the display 14 conceals the auxiliary portion 16 from view when the mobile phone 10 is operating in "standby" mode.

The display 14 includes a screen 22 (e.g., a touch screen) that is configured to display information to a user, such as, operating state, time, telephone numbers, contact information, menus, etc. The user also can view and utilize various features and functions related to the various operating states of the mobile phone 10 on the screen 22. The screen 22 also may be used to visually display content received by the mobile telephone 10 and/or retrieved from a memory of the mobile telephone 10. For example, the user can watch movies, play video games, and browse the internet, etc., on the screen. Such audio/video materials may be stored on memory within the phone or accessed from remote servers, as will be appreciated.

In one embodiment, the screen 22 is a 2.4-inch thin film transistor (TFT) screen that is approximately 2.4-inches to 2.6-inches wide and approximately 2 mm thick. It will be appreciated that different screens, such as larger or smaller screens, or other thin screen technology may be utilized without departing from the scope of the present invention.

Additionally or alternatively, if the mobile phone includes a touch screen, the screen 22 may be navigated by using a stylus or by otherwise touching the surface of the screen to select various functions and/or to input information or data into the phone. Keys or key-like functionality also may be embodied as a touch screen on the display screen, and it will be appreciated that in such embodiments, the functional and/or navigational keys may be incorporated into the touch screen to incorporate a larger screen on the display.

The slider hinge 18 provides or otherwise facilitates movement of the display 14 relative to the base 12, for example, using a slider track. The slider hinge 18 allows the display to move relative to the base in the direction of arrow 2A (also referred to as "upwards," as shown in more detail in FIG. 2) and in the direction of arrow 3A (also referred to as "downwards," as shown in more detail in FIG. 3). While shown as an external hinge, it will be appreciated that the hinge may be incorporated within the housing and may include a slider mechanism that is slidably engaged to a slider track such that the slider hinge is not readily viewable by a user of the phone.

Referring to FIGS. 1B and 1C, the base 12 includes or otherwise houses the lift assembly 20, which is coupled to the auxiliary portion 16 and configured to raise the auxiliary portion 16 relative to the base 12. In one embodiment, the lift mechanism 20 includes a resiliently biased member, such as, for example, a scissor hinge, as shown in FIG. 1C, in combination with a spring, such as a compression spring. The lift assembly 20 is biased such that it tends to extend (and thereby move the auxiliary portion 16 into a raised position (shown in FIG. 4A) when not constrained by a force (e.g., a force applied by the display 14 when it is in a position covering or partially covering the auxiliary portion 16. As is discussed below, when fully extended, the auxiliary portion 16 generally is coplanar with the top surface of the display 14.

While the auxiliary portion 16 is being described as being coupled to the base 12 by the lift assembly 20, it may be configured in a variety of different ways without departing from the scope of the present invention. For example, in one embodiment, the auxiliary portion 16 and lift assembly 20 may be components that are connected or otherwise mounted to the base 12. In accordance with another exemplary embodiment, the lift assembly may be configured to be a part of or otherwise integrally connected or mounted to the slider hinge 18. In this embodiment, the slider hinge 18 may include cooperative rail and sliding mechanisms (e.g., a rail mechanism connected or otherwise mounted to the one of the base or the display and a cooperative sliding mechanism connected or otherwise mounted to the other of the base or the display), where the rail mechanism and/or the sliding mechanism includes or is otherwise coupled to the lift assembly.

The auxiliary portion 16 may be configured in various ways without departing from the scope of the present invention. For example, the auxiliary portion may be configured to include control keys, such as functional or navigational keys that are used for navigating menus or browsing the internet on the display screen 14. The navigational or directional keys may also be used to control audio/visual material, for example to play, pause, skip, repeat, fast-forward and/or rewind movies or audio tracks. The control keys also may be directional control keys used for controlling gaming operations.

Any physical keys or buttons (e.g., hard keys) disposed on the auxiliary portion 16 have a low profile construction such that the display 14 can be easily slid over the top of the auxiliary portion 16 without interference from the buttons. In another embodiment, the auxiliary portion is configured to include a touch-sensitive input device (e.g., a touch display or a touch-sensitive control panel). The auxiliary portion 16 also may be an extension of the display screen 22, for example, to increase the viewing area available to browse the internet, watch videos, or play games, etc. Further, the auxiliary portion 16 may include touch screen functionality and controls, as described above with respect to the display 22.

In one embodiment, the mobile phone 10 includes a mechanical implement 24 that prevents or inhibits downward sliding movement of the display 14 relative to the base 12, while allowing the display 14 to slide upwards, for example, to answer a call or for messaging applications. In one embodiment, the mechanical implement 24 may be a button on the side or the top of the mobile phone 10. A portion of the button extends to the inside of the mobile phone and prevents (e.g., downward) movement of the display relative to the base, for example, by blocking a portion of the sliding track or engaging a notch on the slider track. By pressing the button 24, the display 14 may be released and the user may then slide the display downward relative to the base 12 to expose the auxiliary portion 16. The button 24, however, does not impede motion of the display 14 in a first direction, e.g., in the upward vertical direction) and, as such, the mobile phone 10 can be freely slid between the configurations of FIG. 1 and FIG. 2.

The mobile phone 10 includes a set of functional and navigational keys 26 that provide for a variety of user input operations. For example, the functional keys 26 typically include special function keys, such as a "call send" key for initiating or answering a call, and a "call end" key for ending or "hanging up" a call. Special function keys also may include menu navigation keys, for example, for navigating through a menu displayed on the display(s) to select different telephone functions, profiles, settings, etc., as is conventional. Other navigational keys or controls may include directional keys (e.g., up, down, left, and right) to highlight different links, or icons, or to navigate text or other documents, etc. The navigational controls 26 also may be in the form of a roller ball or navigational ball, as will be appreciated. Other keys associated with the mobile telephone may include a volume key, an audio mute key, an on/off power key, a web browser launch key, a camera key and the like. The navigational keys may be embodied as "hard keys" or "soft keys" implemented on a touch-sensitive input device.

Referring to FIG. 1C, the base 12 also houses a main printed circuit board assembly (PCBA) 28 that includes the electronics, memory, and circuitry, etc., necessary for operating the mobile phone 10, including conventional call circuitry that enables the mobile telephone 10 to establish a call or otherwise exchange signals other devices, such as other mobile devices, internet web servers, media servers, or the like. The call circuitry also may be responsible for transmitting and receiving text messages, emails, or text documents. Additionally, the mobile phone 10 may include circuitry for browsing the internet, playing or viewing audio/visual materials, such as picture, music or video files and for gaming operations. Circuitry that controls the display 14 as well as the auxiliary portion also is included. In one embodiment where the auxiliary portion is configured as an extension of the main display, display control circuitry converts image data to be displayed on both the main display and the auxiliary display in a substantially seamless manner. As is discussed more fully below, the mobile phone 10 can be configured to operate in both portrait and landscape orientations depending upon whether the auxiliary portion 16 is in use.

Figure 4C:
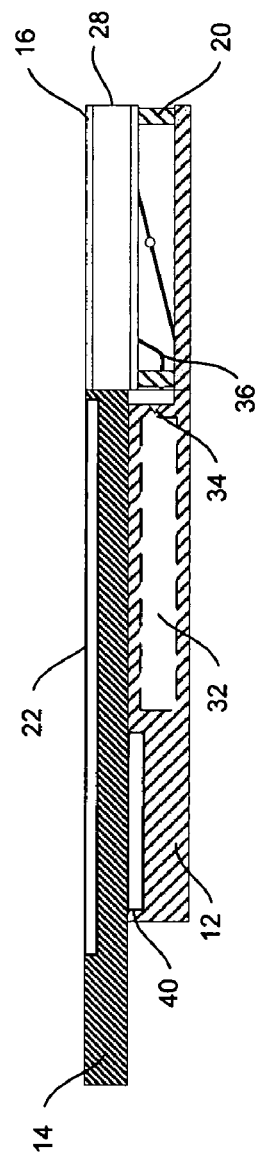
FIG. 4C is a sectional view of the mobile telephone of FIG. 4A.

In the illustrated embodiment, the main PCBA 28 is mounted to the lift assembly 20. A second, adjacent PCBA 30 is electrically connected to the battery, which provides the necessary power for operating the mobile phone 10. The battery compartment 32 is housed within the base 12. A connector 34 establishes an electrical connection between the battery and the adjacent PCBA 30. The main PCBA 28 is connected to the adjacent PCBA 30 with a flex circuit 36 (FIG. 4C). The flex circuit 36 maintains an electrical connection between the main PCBA 28 on the lift assembly 20 and the adjacent PCBA 30 in both the raised position and the lowered position.

Figure 2B:
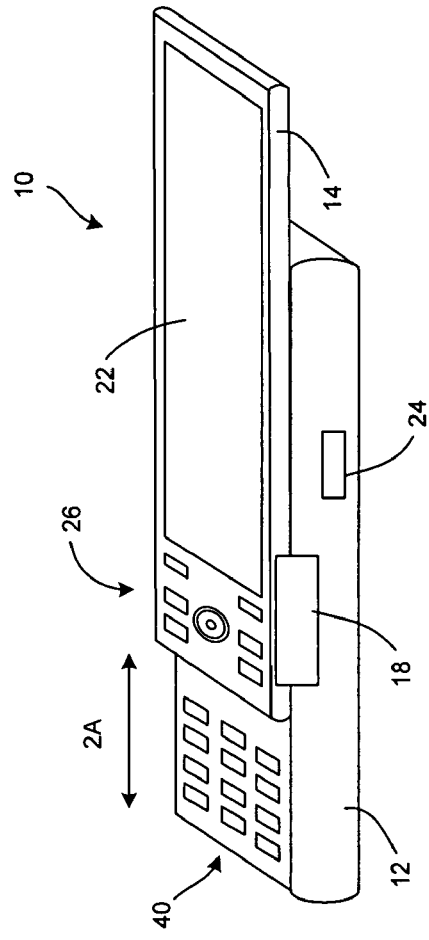
FIG. 2B is a perspective view of the mobile telephone of FIG. 2A.
Figure 2A:
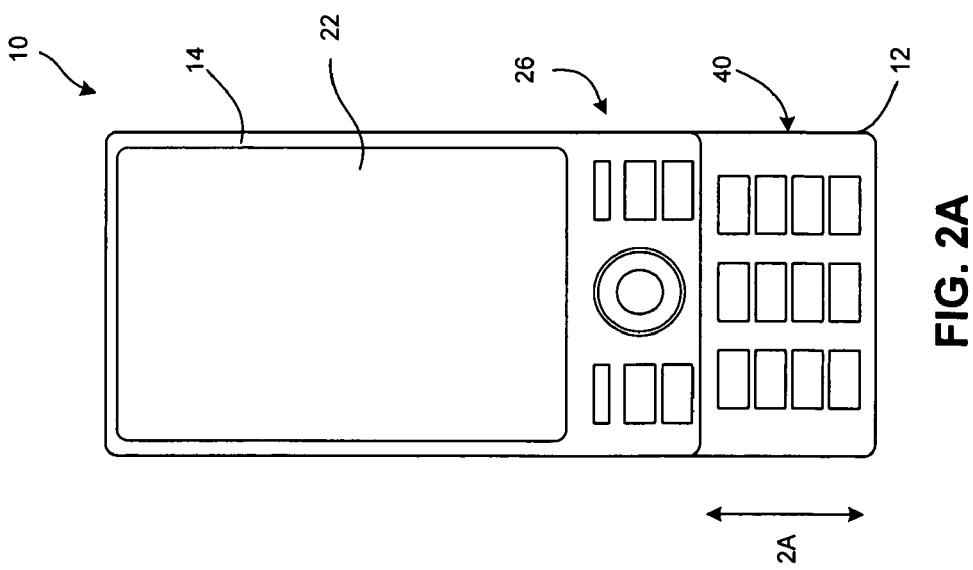
FIG. 2A is a top view of the mobile telephone of FIG. 1A slid open to expose a keypad.

Referring to FIGS. 2A-2C, the mobile phone may be operated in a first mode, (e.g., in a "talk" or "messaging" mode) by sliding the display portion 14 relative to the base portion 16 to access a keypad 40, in the direction of arrows 2A. As shown in FIG. 2C, the auxiliary portion 16 is maintained in a retracted position and concealed by the display 14 when the phone is in this configuration.

The keypad 40 is used to enter information, such as, for example, phone numbers, text messages or other alphanumeric characters and/or information, and for using the functionality of the phone. The keypad 40 may include a conventional numeric/telephone keypad, or a QWERTY keyboard.

Operation of the mobile phone in the configuration of FIG. 2 is well known by those of skill in the art and, therefore, will not be discussed in detail.

Referring to FIGS. 3A-3B, the mobile phone may be slid between a first position (e.g., the "standby" position of FIG. 1) and a second position (e.g., an auxiliary position shown in FIG. 4) by sliding the display 14 relative to the base 12 in the direction depicted by arrows 3A.

As shown in FIGS. 3A and 3B, the display 14 is shown in a partially open position. As described above, prior to being slid open in the direction of arrows 3A, the user may press the button 24 to release the display 14 for movement to a second position (e.g., downward movement along arrows 3A). As the display 14 is slid relative to the base 12, it begins to reveal the auxiliary portion 16, as shown in FIG. 3B. The auxiliary portion 16, however, remains in the retracted position until the trailing edge of the display 42 clears the entire auxiliary portion 16.

Figure 4B:
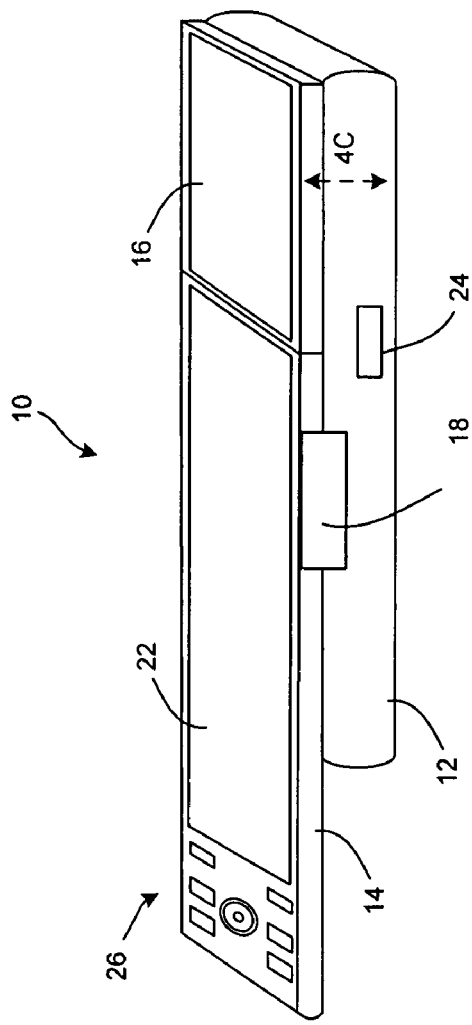
FIG. 4B is a perspective view of the mobile telephone of FIG. 4A.
Figure 4A:
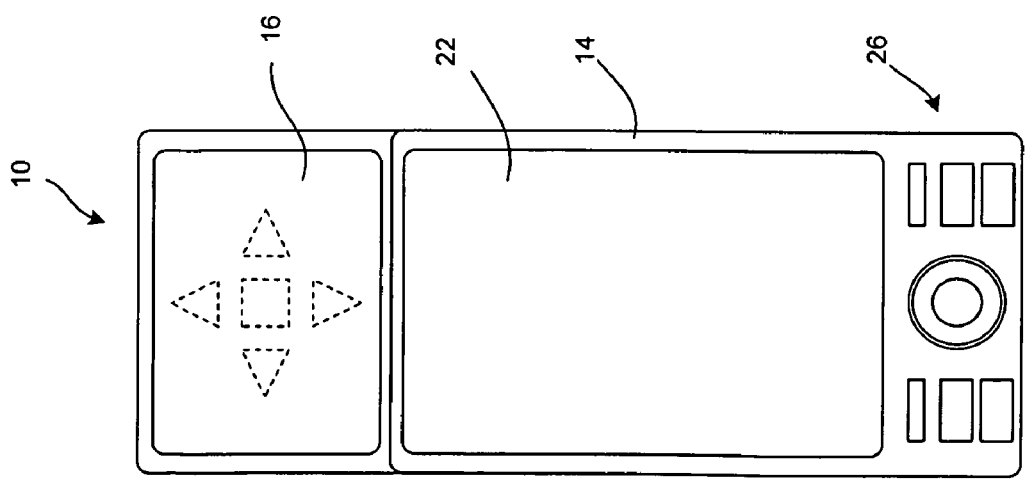
FIG. 4A is a top view of the mobile telephone of FIG. 1A with a raised auxiliary portion.

When the display 14 is slid fully open, the lifting assembly 20 raises the auxiliary portion 16 relative to the base as shown in FIG. 4. Thus, referring now to FIGS. 4A-4C, the mobile phone 10 is shown with the lifting mechanism 20 in the fully raised position such that the auxiliary portion 16 is generally aligned with the display 14 (e.g., substantially flush or otherwise coplanar with the surface of the display).

The auxiliary portion 16 is raised and lowered relative to the base in the direction depicted by arrows 4C by the lifting assembly 20, which may be actuated or released in any of a number of conventional ways. For example, the lifting mechanism may automatically raise the auxiliary portion 16 once the display 14 is slid to the fully open position. Alternatively, the lifting assembly may be maintained in the retracted position by a latch or other mechanism that can be released by user, for example, a button. In yet another alternative, the button 24 may be pressed to simultaneously release the display 14 to slide in the direction of arrow 3A and the lifting mechanism 20. Rather than pressing a button, the lift assembly 20 also may be automatically released, for example, with a spring hinge that may be tripped once the display 14 is slid to the fully open position. It also will be appreciated that instead of a mechanical implement, an electronic securing mechanism may be utilized for example, an electromechanical switch or other latching mechanism that may be released by pressing the button 24 or another actuator.

When the lifting assembly 20 is fully raised, the tension or bias in the lifting mechanism 20 maintains the lifting mechanism 20 in the extended position so that the user may utilize controls on the auxiliary portion 16. It will be appreciated that the bias in the lifting mechanism 20 will provide sufficient rigidity to allow the user to press or otherwise use the controls that may be disposed on the auxiliary portion 16.

In addition to the bias, a mechanism also may be used to restrict the movement of the lifting assembly 20 to maintain it in the raised position and to prevent accidental or inadvertent closure. Additionally or alternatively, the release button or latch may provide additional support to the auxiliary portion when it is in the extended position. For example, the release mechanism may include a locking mechanism for engaging a latch beneath the auxiliary portion 16 to maintain lift assembly 20 in the open/extended position. It will be appreciated that this restraining mechanism may be combined with the button 24 as a single, combined mechanism that may be used to control both the movement of the display 14 in direction 3A and the lift assembly 20 in direction 4C.

As shown in FIG. 4C, the main PCBA 28 is connected to the adjacent PCBA 34 with the flex circuit 36. The flex circuit 36 maintains the electrical connection between the main PCBA 28 on the lift assembly 20 and the adjacent PCBA 30 in both the raised position and the lowered position.

The lifting mechanism can be returned to its retracted or lowered position by releasing the locking mechanism (if activated) and pressing the auxiliary portion 16 toward the base 12 (e.g., inwardly) in the direction of arrow 4C. For example, if a scissor hinge is utilized, the user may lower the lift assembly 20 by pressing down on the auxiliary portion 16 with enough force to overcome a detent in the scissor hinge. When the lifting mechanism is fully retracted, it may be automatically latched or retained into place by the latch or other locking mechanism. The display 14 may then be slid to conceal the auxiliary portion 16, and the phone 10 may be returned to the configuration of FIG. 1 and used in its conventional manner. In another embodiment, the auxiliary portion may include a beveled or angled edge configured to cooperate with the edge 42 of the display or top portion 14 such that upward movement of the display 14 causes retraction of the auxiliary portion 16 due to a sliding force between the edge 42 and the angled edge of the auxiliary portion 16. Other retraction configurations may be employed without departing from the scope of the present invention.

The provision of an auxiliary portion provides a mobile phone having enhanced functionality and versatility. For example, the provision of an auxiliary portion and cooperative lifting assembly provides the conveniently-sized form factor or footprint of a slider-type phone along with the enhanced control space/features and/or display space/features found in phones having larger form factors. Stated differently, the above-described mobile phone provides the look and feel of a larger phone with more display area and/or control area with the smaller footprint often associated with conventional slider phones.

In addition, the provision of an auxiliary display and/or control area provides for a versatile mobile phone that may be operated in a first mode (e.g., in a portrait orientation) for calling and simple messaging operations, and a second mode (e.g., in a landscape orientation) for web surfing, gaming and/or other multimedia operations. For example, in one embodiment, the auxiliary portion can be configured as a touch-sensitive control interface and the phone can operate in a "balanced mode" where a user can hold the device with both hands in a landscape mode having control areas on both sides of a relatively-centered main display. Other modes of operation that make use of the auxiliary portion may be realized without departing from the scope of the present invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A portable communication device comprising:
a base portion;
a display portion coupled to the base portion by a hinge, wherein the hinge is configured to facilitate sliding motion between the base portion and the display portion; and
an auxiliary portion coupled to the base portion by a lift assembly, the lift assembly configured to move the auxiliary portion from a retracted position to a raised position; and
wherein the display portion is movable relative to the base to a first position in which the display portion conceals the auxiliary portion and a keypad disposed on the base is accessible, and a second position in which the auxiliary portion is not concealed by the display and the auxiliary portion is raised relative to the base to be substantially coplanar with the display portion.

2. The portable communication device of claim 1, wherein the lifting assembly is spring loaded.

3. The portable communication device of claim 1, wherein the lifting assembly comprises a scissor hinge.

4. The portable communication device of claim 1, wherein the lifting assembly comprises a compression spring.

5. The portable communication device of claim 1, wherein the auxiliary portion comprises an auxiliary display.

6. The portable communication device of claim 1, wherein the auxiliary portion comprises a control panel.

7. The portable communication device of claim 1, wherein the auxiliary portion comprises touch screen controls.

8. The portable communication device of claim 1, wherein the auxiliary portion comprises a touch-sensitive input device.

9. The portable communication device of claim 1, wherein the portable communication device is a mobile phone.

10. A portable communication device comprising:
a base portion; and
a top portion coupled to the base portion by a sliding hinge assembly, wherein the sliding hinge assembly is configured to facilitate sliding motion between the base portion and the top portion in a first direction and in a second direction opposite the first direction; and
an auxiliary portion coupled to the base portion, wherein the auxiliary portion is configured to remain in a retracted position when the top portion is moved in the first direction to a first position and to move to a raised position when the top portion is moved in the second direction to a second position.

11. The portable communication device of claim 10, wherein the top portion includes a display.

12. The portable communication device of claim 11, wherein the top portion and the auxiliary portion cooperate to partially retract the auxiliary portion when the top portion is moved from the second position in the first direction.

13. The portable communication device of claim 10, wherein the auxiliary portion includes a touch-sensitive input device.

14. The portable communication device of claim 13, wherein the touch-sensitive input device is a touch screen.

15. The portable communication device of claim 10, wherein the portable communication device is configured to operate in a portrait mode when the display portion is in the first position, and the portable communication device is configured to operate in a landscape mode when the display portion is in the second position with the auxiliary portion in the raised position.

16. The portable communication device of claim 10, wherein the portable communication device is a mobile phone.

* * * * *